US008254531B2

(12) United States Patent
Salonen

(10) Patent No.: US 8,254,531 B2
(45) Date of Patent: *Aug. 28, 2012

(54) METHOD AND SYSTEM FOR COMBINING TEXT AND VOICE MESSAGES IN A COMMUNICATIONS DIALOGUE

(75) Inventor: Jukka Salonen, Nurmijärvi (FI)

(73) Assignee: Bookit Oy Ajanvarauspal Velu, Helsinki (FI)

( * ) Notice: Subject to any disclaimer, the term of this patent is extended or adjusted under 35 U.S.C. 154(b) by 854 days.

This patent is subject to a terminal disclaimer.

(21) Appl. No.: 12/226,878

(22) PCT Filed: Apr. 26, 2007

(86) PCT No.: PCT/FI2007/050229
§ 371 (c)(1),
(2), (4) Date: Feb. 2, 2009

(87) PCT Pub. No.: WO2007/125171
PCT Pub. Date: Nov. 8, 2007

(65) Prior Publication Data
US 2009/0290691 A1    Nov. 26, 2009

(30) Foreign Application Priority Data
May 2, 2006    (FI) .................................... 20060419

(51) Int. Cl.
*H04M 11/00*    (2006.01)
(52) U.S. Cl. ..................................... 379/88.13; 455/466
(58) Field of Classification Search .................. 455/466; 379/88.13, 93.12, 88.11
See application file for complete search history.

(56) References Cited

U.S. PATENT DOCUMENTS
6,085,100 A    7/2000  Tarnanen
(Continued)

FOREIGN PATENT DOCUMENTS
EP    0 881 802 A1    12/1998
EP    1458201 A1    9/2004
WO    WO-2004/019223 A1    3/2004

*Primary Examiner* — Olisa Anwah
(74) *Attorney, Agent, or Firm* — Birch, Stewart, Kolasch & Birch, LLP.

(57) ABSTRACT

This publication discloses a method for delivering messages in a telecommunications network (1, 2, 6, 11, 12). In the method, the first text-form message (40) of the session N is delivered (43) to the user of the service, in such a way that the sender address (e.g., the A number) is converted to correspond to the session number N and the session stage J, in stages 2-n (41) of the session N, a text-form message (40) is received, from the user of the message service, at the sender address defined in the message in the previous stage, and the session proceeds according to the contents of the message (40), in such a way that the sender address (e.g., the A number) is converted to correspond to the session number N and the new session stage J, and the next text-form message of session N is sent to the user of the message service. According to the invention, in some stage of the session N, a voice message is received (42), from the user of the message service, at the sender address of the message defined in the message (40) in the previous stage, or at an address contained in the message, and the session proceeds according to the content of the message (40), and if necessary, the next text-form message of the session N is sent to the user of the message service, in such a way that the sender address (e.g., the A number) is converted to correspond to the session number N and the new session stage J.

22 Claims, 4 Drawing Sheets

U.S. PATENT DOCUMENTS

| | | | |
|---|---|---|---|
| 6,990,332 B2 * | 1/2006 | Vihinen | 455/414.1 |
| 7,660,397 B2 * | 2/2010 | Heen et al. | 379/40 |
| 2004/0128158 A1 | 7/2004 | Salonen | |
| 2004/0198322 A1 | 10/2004 | Mercer | |
| 2007/0135101 A1 * | 6/2007 | Ramati et al. | 455/414.1 |
| 2008/0147408 A1 * | 6/2008 | Da Palma et al. | 704/270.1 |

* cited by examiner

METHOD AND SYSTEM FOR COMBINING TEXT AND VOICE MESSAGES IN A COMMUNICATIONS DIALOGUE

The present invention relates to a method, according to the preamble of Claim 1, for combining text and voice messages in a communications dialogue.

The invention also relates to a system according to Claim 8.

Methods and systems of this kind are used, for example, for implementing text-message based booking services.

According to the prior art, message dialogues are implemented purely on a text-message basis. A message dialogue may break, if it has been wished to make contact in the dialogue with the aid of a voice message, such as a voice call. The dialogue has had no support for voice messages, instead the voice message has remained an event external to the dialogue.

In addition, according to the prior art, bulk deliveries of e-mail messages have been implemented from a number inside operators' networks using Content Gateway technology. The delivery address of the Content Gateway bulk-delivery technology on the network side is not a familiar telephone number, which has the form +358 400 123 456, but is a short service number, which is not a real telephone number, but instead, for example 16400. Because it is not a real network number, it also cannot roam from one network to another, but goes directly to the content gateway of the operator in question. In the present document, the term roaming refers to either the updating of number information when a terminal device moves from one country to another, or the functionality of a service number when the service is used from a different country to that in which the service provider is located. Operators have constructed varied and complex solutions, by means of which services can be made to function also in other operators' networks and number spaces. In practice, this leads to complicated mutual agreements on the joint use of specific numbers, for example, by routing messages coming to the specific number of another operator back to the operator owning the number.

For years, attempts have been made to harmonize numbers on a European level, but the competing operators have never reached agreement on general service numbers. A additional drawback of the present technology is that, in the solution, the connection equipment inside the network of one operator should be connected with the corresponding connection equipment of all the other operators of networks (point to point). This creates a large number of agreements and connections from one place to another. Therefore in practice such solutions only function between a few operators.

The message bulk-delivery systems according to the prior art are thus implemented on a telephone-operator-specific basis, in such a way that the 'sender' field of the messages has shown the operator's own number, which as described above is not a roaming number. The services have therefore not functioned outside the own country. Such a system is not suitable for query dialogues of a demanding type, as the use of the 'reply function' has always returned the messages to the same number and then only if the subscriber has been in their home network.

Attempts have also been made to solve the problem using tailor-made modem banks, but these solutions have been slow, expensive, and even unreliable.

The invention is intended to eliminate the defects of the prior art disclosed above and for this purpose create an entirely new type of method for combining text and voice messages in a communications dialogue.

One preferred embodiment of the invention concerns applying the aforementioned method to the bulk delivery of messages, and providing the invention for international use.

The invention is based on receiving, in the message dialogue, a voice message (voice-call or VoIP connection), from the user of the message service, at the message's sender address defined in the previous stage of the dialogue, or at an address contained in the message, and proceeding according to the contents of the message. If necessary, the session's next text-form message is sent to the user of the message service, in such a way that the sender address (e.g., the A number) is altered to correspond to the session number and new session stage.

According to a preferred embodiment of the invention, the desired reply address of each bulk-delivery message, typically the sender information, is altered to correspond to a predefined dialogue, in which the stage of the dialogue defines unequivocally the sender information, in which case the sending and reception of messages is implemented in different parts of the telecommunications network.

More specifically, the method according to the invention is characterized by what is stated in the characterizing portion of Claim 1.

The system according to the invention is, for its part, characterized by what is stated in the characterizing portion of Claim 8.

Considerable advantages are gained with the aid of the invention.

The voice-message possibility according to the invention creates flexibility in the dialogue, but does not, however, break the flow of the logic of the dialogue. Flexibility can be implemented in a very user-friendly manner, in which case text-form messages are used to route the sound-message queries to precisely the correct and free recipient, at its best in such a way that the respondent will know both the caller and his dialogue, and even the stage of the dialogue, so that unnecessary connections that waste the user's time will be avoided, and also the capacity of the messaging network will be saved.

Preferred embodiments of the invention are operator independent and function in the networks of all operators. The most typical applications of the invention function in any gsm-customer's telephone in any network. The invention provides a cost advantage on the sending side due to bulk sendings and, nonetheless, the reception functions completely country independent, that is completely roaming in respective operator's network.

In the following, the invention is examined with the aid of examples and with reference to the accompanying drawings.

Figure 1:
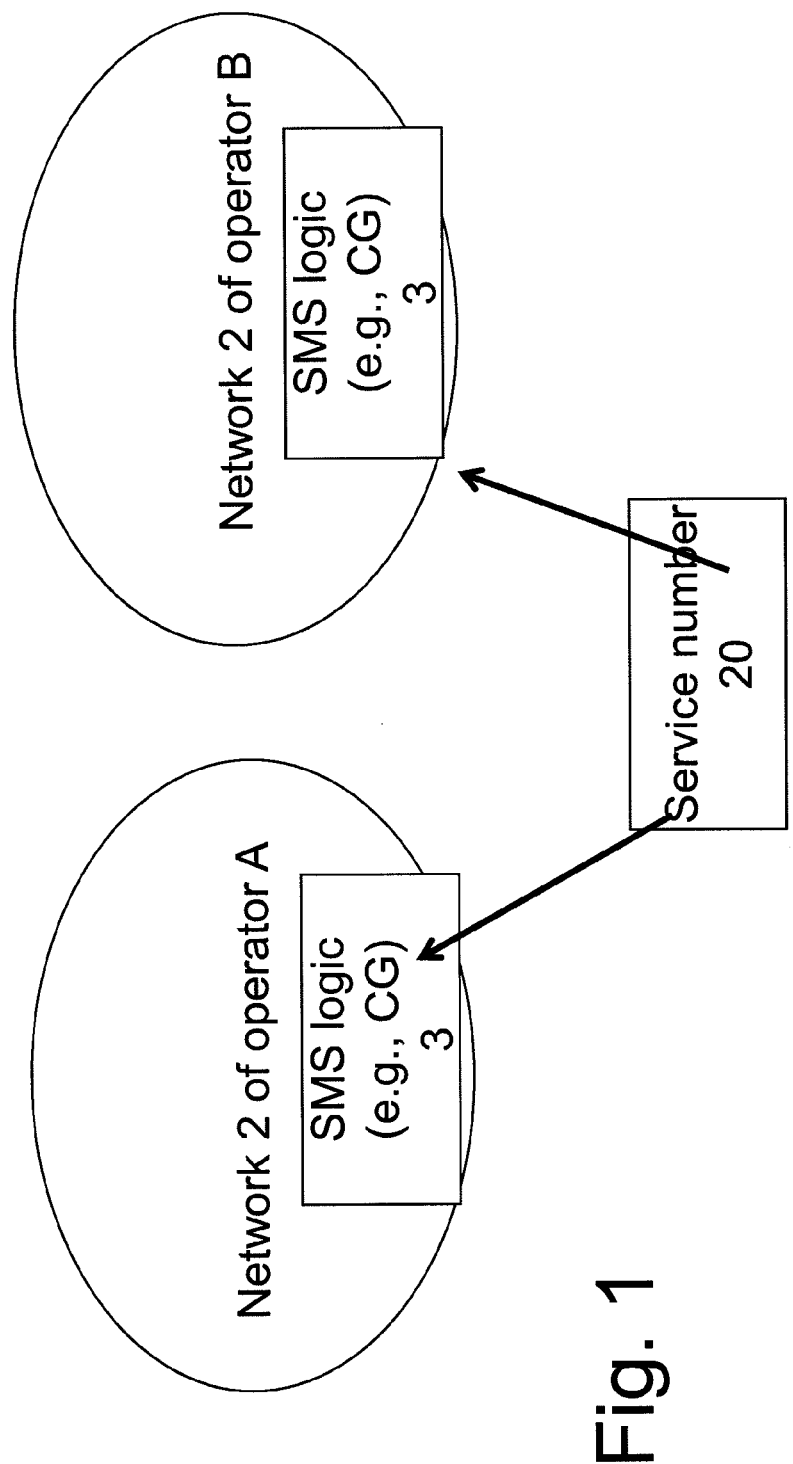
FIG. 1 shows schematically a solution according to the prior art.

In FIG. 1, according to the prior art, telephone operators A and B have text-message bulk-delivery means 3 in their own networks, by means of which each operator can effectively deliver large numbers of text messages. In the solution shown, each operator has a service number 20 relating to the joint message service arranged agreement and connection technically, which is not available to operators outside the agreement. According to the prior art, the service number 20 is a non-roaming short number.

Figure 2:
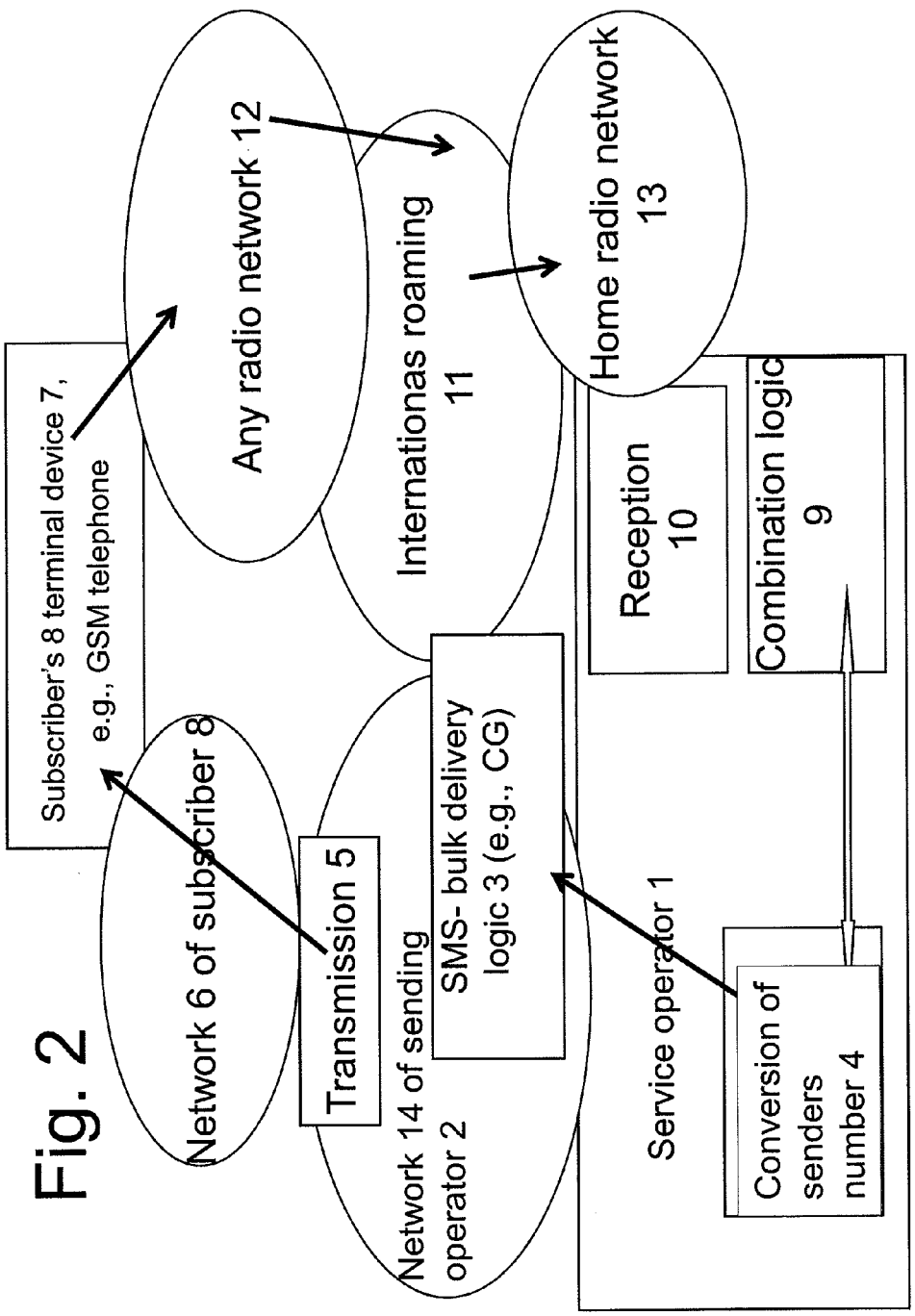
FIG. 2 shows a block diagram of a solution according to a preferred embodiment of the invention.

In the system according to FIG. 2, there are typically two parties, which in exceptional cases can be the same company.

The service providing service company or association 1, which provides subscribers 8, for example, with booking services for buying tickets, changing tyres, etc. The service company or association 1 operates in a radio network, the home network 13 of some operator.

In the present application, the term service company or association 1 refers to an association or company, which operates in either its own or an extraneous telecommunications network, and produces either directly or indirectly services for customers. Such a company or association is typically a sub-contractor of an actual telephone operator, nor does a user of the service necessarily even know of the existence of the service company or association 1. In a preferred embodiment of the invention, the service company or association produces either directly or indirectly many kinds of booking and reservation services for telephone subscribers. The invention can also be used within a single association.

The system also includes a telephone operator 2, in the network 14 of which there are means and equipment for the bulk delivery of digital messages containing sender information (such as SMS messages). Such a practical network element is, for example, SMS bulk-delivery logic 3, which can be implemented, for example, using Content Gateway technology.

Figure 3:
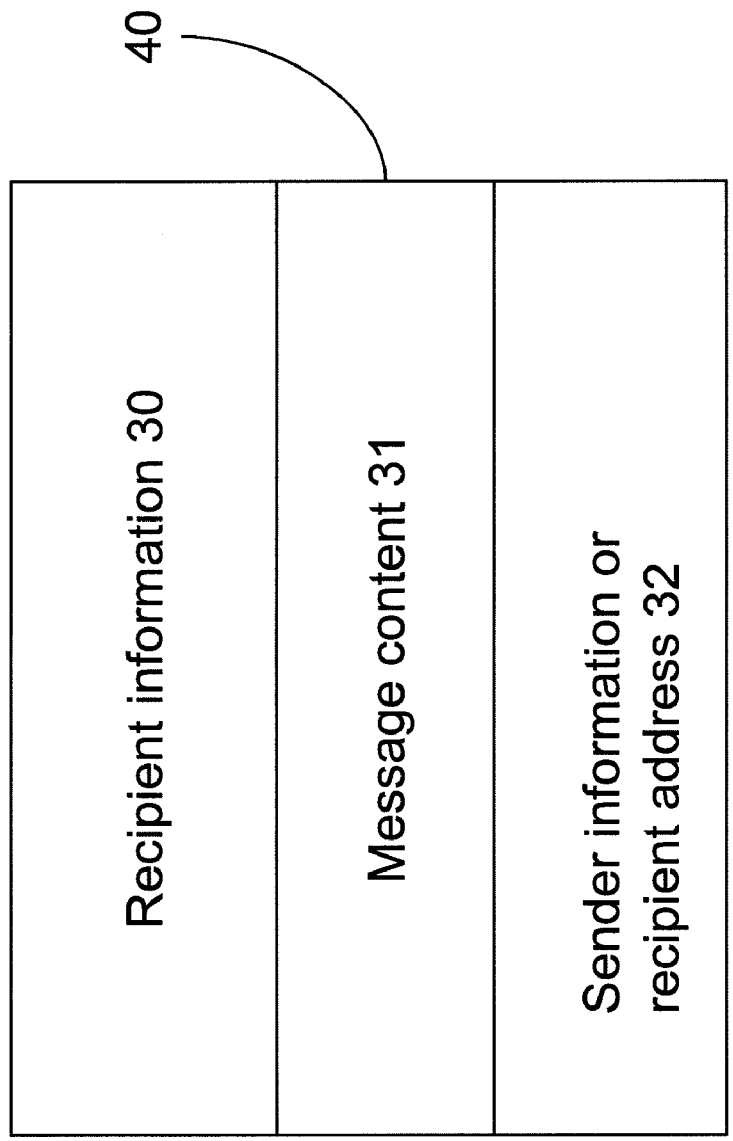
FIG. 3 shows schematically information fields in a message according to the invention.

With reference to FIGS. 2 and 3, in the first service stage the service company or association 1 uses combination logic 9 and number conversion 4 to form a large number of messages 40, each of which contains recipient information 30, the actual message 31, and information 32 of either the sender or in practice the address, to which a reply to the message 40 is desired. In an SMS (Short Message System) application, the recipient information 30 is a mobile-station number and the sender information 32 is the sender information in the sender field 32 of the SMS message altered using a number converter 4.

Within the scope of the invention, the message 40 can be any message whatever that can be sent through a digital information network, which comprises recipient information, the actual message, and information on the desired reply address, for example, in the form of sender information. Such message 40 can be besides SMS messages, for instance, e-mail messages, or, for example, multimedia messages (MMS).

A large number of the aforementioned messages can be formed dynamically on the basis of complex dialogues. Correspondingly, for example, in emergency applications, the message totality can be static and ready for an emergency situation.

In the conversion of the desired reply address, for example of the sender's number, it is possible to take into account the address (or number) from which the connection to the service company or association 1 has been formed. In this way, it is possible to route the messages of subscribers 8 in the USA to their own national server, and correspondingly the messages of Finnish users of the same service to their own national server. From these national servers, the reply messages can be transferred over suitable telecommunications links to the service company or association 1 for further measures.

The messages formed by the service company or association 1 are sent to the bulk-delivery logic 3, which is located in the operator's 2 network 14, from where the bulk delivery 5 of the messages is implemented. From here the messages 40 disperse always according to the recipient information 30 and arrive at the subscriber's 8 terminal 7 through the subscriber's 8 radio network 6 at the time. The subscriber 8 can reply to the message using the 'reply' function, in which case the reply message is sent to the address that is defined by the value of the sender or reply-address field 32. The message 40 leaves to the service company or association 1 through radio networks 12, 11, and 13. Naturally, if the subscriber 8 is within the area of the home network 13 of the service company or association 1, the message will not travel through the networks 11 and 12. From the home network 13, the message is transferred to the reception 10 of messages for the service company or association, where it is combined with a suitable dialogue with the aid of combination logic 9 and number conversion. In practice, networks 13 and 14 may be the same thing.

More concretely, for example, in an SMS application, when a message is sent to the subscriber 8, the sender's number (A number) is converted before bulk delivery in block 4, for example, to +358500001 in the first stage of a predefined session (dialogue). The number space of the sender's number (A number) is defined by the service provider's I own number space, which in the invention is entirely independent of the number space of the sending operator 2. In the following stage of the same session, the A number is, for example, +358500002, guided by the logic 9 of the service company or association 1, and so on. The sending A number is tightly defined from a logically progressing dialogue formed by the service provider 1, in which the reply to each message sent is awaited at a specific telephone number (digital reply address), which is contained in the message sent as the A number.

Thus, the subscriber replies to the SMS message using the reply function, so that in the first stage of the dialogue the reply goes to the number +35800001 and correspondingly in the second stage of the dialogue to the number +3580002.

Example of Dialogue:

Message Sender's number

1. Do you need to book a time for tyre changing, reply Y/N +35850001

2. Is 07.12.2005 suitable, reply Y/N +35850002

With the reply 'Y' of the subscriber 8 the system of the service provider sends a message 2. The dialogue terminates, if the reply to the first message is 'N'. In stage 2, the reply 'Y' leads to the time being booked, whereas the reply 'N' leads to a new booking proposal.

According to the invention, the system can route a message to the subscriber (user) 8, in the content of which there is a telephone number ready for a voice message. This information can also be converted as the sender information of the message, i.e. the converted A number. Thus either of the numbers is selected in such a way that when the subscriber (user) 8 makes a voice-message call (voice call or VoIP connection) to this number, the system sends to the recipient of the call the information on the sender, for example, on basis of the A number, and in addition also of the information relating to the stage of the dialogue, in which case the person replying to the voice message will know not only the identity of the subscriber (user) 8, but also what the call concerns and the dialogue will continue logically.

The messages described above are, thus, sent as a bulk delivery to hundreds/thousands of recipients at one time and the A number (=field 32) of the first stage of the dialogue would then always be +35850001 and correspondingly in the second stage of the dialogue always +35850002, so that the reply to each message sent will always be targeted to the right number. In connection with the reply, the A number of the sender 8 is, in turn, defined by the person for whom the booking is made.

Figure 4:
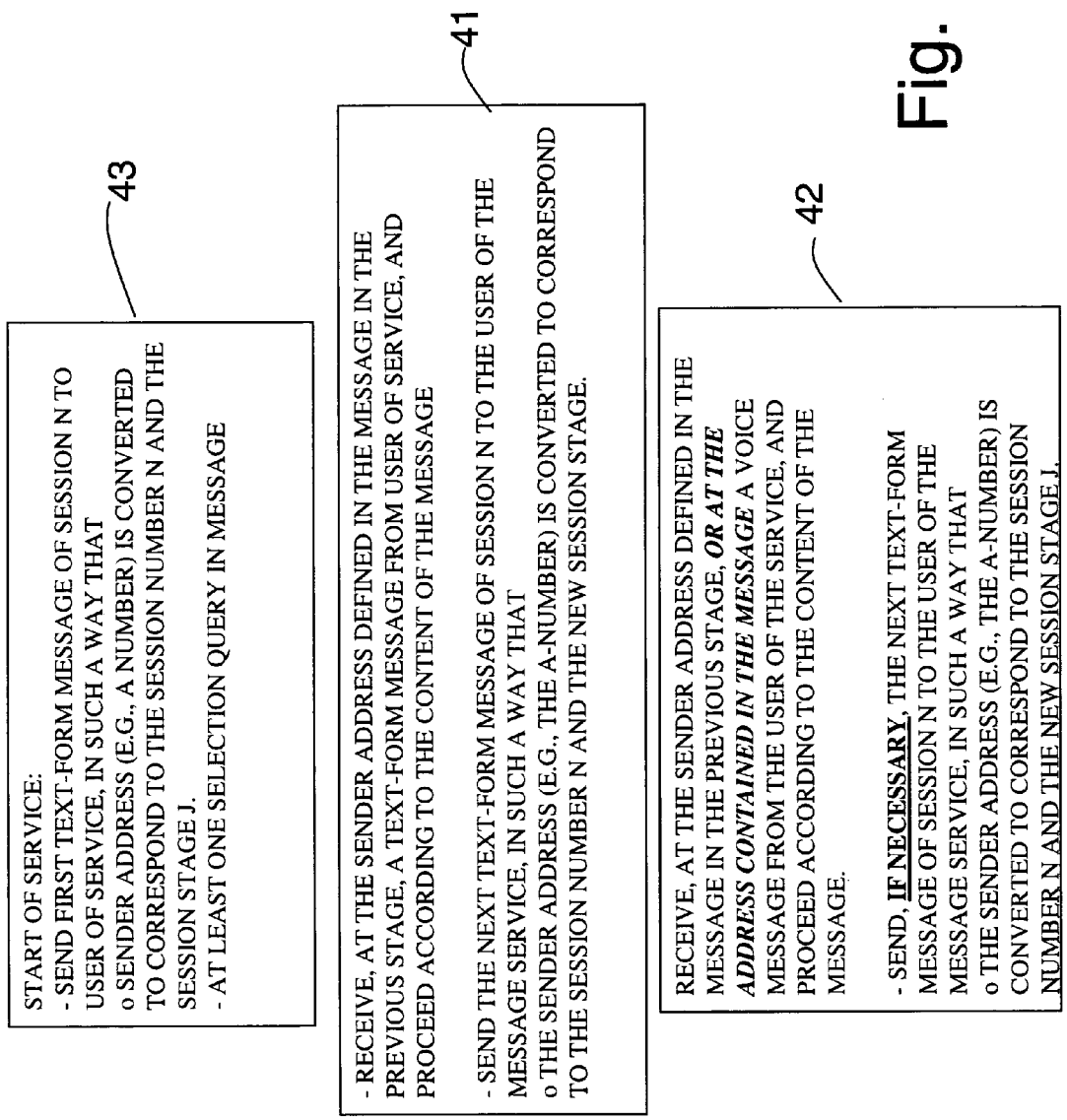
FIG. 4 shows a flow diagram of a solution according to the invention.

According to FIG. 4, the method according to the invention is implemented as follows:

The long, logically continuous, temporally discontinuous session N is implemented as follows. The session N is divided in to sub-stages J (43, 41, 42), which are typically temporally separated from each other. The actual session N is, however, logically continuous, in other words the queries and replies proceed logically for the entire duration of the session.

The service relating to the session N is started in block 43. The first text-form message of session N is then sent to the user of the service, in such a way that the sender address (e.g. the A number) is converted to correspond to the session number N and the session stage J.

In block 42, the stages 2-n of the session N are depicted, in which a text-form message is received, from the user of the message service, at the sender address defined in the message in the previous stage, and the session then proceeds according to the content of the message, in such a way that the sender address (e.g. A number) is converted to correspond to the session number N and the new session stage J. Next, the following text-form message of the session N is sent to the user of the message service.

According to block 42, an additional stage according to the invention is implemented in such stage of the process, in which a voice message (voice call or VoIP connection) is received, from the user of the message service, at the sender address of the message defined in the message in the previous stage, or at an address contained in the message, and the session then proceeds according to the contents of the message, as either a new voice message (voice call or VoIP connection), or as a text message. Several consecutive voice messages (voice call or VoIP connection) belonging to the session N can also be controlled according to the invention, according to a logically continuous, temporally discontinuous session N.

After this, if necessary the following text-form message of session N is sent to the user of the message service, in such a way that the sender address (e.g. A number) is converted to correspond to the session number N and the new session stage J.

According to the invention, a preferred embodiment is an SMS message, but according to the invention the message can be some other digital short message, in which it is possible to reply to the message, without separately defining the recipient. Thus the sender or reply-address field (field 32 in FIG. 3) can contain, instead of telephone-number information, the desired reply address in some other form, for example, as an e-mail address, or as numeric or alphanumeric sender or reply-address information.

Thanks to the number conversion, the message is typically received in an open radio network external to the network of the operator 2, which sent the message, and is routed on the basis of the A number to the system of the service company or association 1.

Thus, in the invention, in an SMS application, before bulk delivery the information of the 'sender' field of the text message is changed, in such a way that a different value is written in it to what the sender's number is in reality. This value is obtained from the logic 9, 10 of the service company or association 1, according to a predefined rule, in such a way that the queries and replies arriving in the logic can be combined.

In addition, in the system of the service company or association 1 there is logic 9 connecting the sending end and the receiving end, which can combine a sent message and its return message arriving from an extraneous operator 2, in such a way that the subscriber can reply (from outside the network) from any subscription whatever, but, however, the sending can take place from inside the network using a large capacity and economically. I.e. it is possible to select the cheapest sending operator, but receive from anywhere in the information network.

According to the invention, at the receiving end of the messages it is possible to disperse reception, in such a way that, for example, in Sweden reception takes place in a local network element and in Finland correspondingly in a Finnish network element, from which national network elements the received messages are transferred using suitable connections, for example, an IP link, to the system of the service company or association, for further processing. Thus the international roaming of the service is faster and cheaper, as well as more reliable. In addition, the use of the service is more pleasant for the consumer, because sending takes place to the number of a local operator, and not to the network of a foreign operator, which is considered to be expensive. In some subscriptions, a foreign message is even blocked, i.e. may not function without the service according to the invention.

One application of the invention is described in the following:

There are thousands of experts, who are needed in various catastrophe or emergency situations, or in other unexpected situations, where there is an acute need to have a large number of experts acting simultaneously. Often the situation is such that personnel is required in several locations simultaneously, in which case the emergency control room will send messages concerning several locations. The personnel required then receives the message, using the system according to the invention, in their telephones and each recipient replies to the message that seems most appropriate. Thus the emergency control room can decide on the basis of the replies who to send to which operation and in which area.

For example, after an earthquake an emergency control centre sends messages to thousands of emergency-aid specialists, using bulk-delivery logic, stating that help and expertise are required in Area 1, Area 2, and Area 3. When an emergency-aid specialist receives these three messages through his own operator, he can reply to the message that is the best alternative for him. The reply from the expert leaves through a radio network to the number defined by the message as an individual message through the service company or association 1 to the emergency control centre. Once the replies have been received, the server of the service provider 1 can combine the information on which expert is going to which of the areas 1-3. Thus the emergency control centre can act immediately and get the necessary personnel and equipment rapidly to their destinations.

In the above application, it is also possible to the user of the subscription to be given a possibility to use a voice message according to the invention.

One application according to the invention is also the creation of a link to a person who travels globally in the service of an international major corporation. Large corporations typically have their own message communications centres, responding to the messages sent by which is difficult using existing technology, because if, for example, an American receives a group message from his company when he is in India, the 'reply' function cannot be used to reply to the message, because using existing technology there is a non-international number in the sender field. According to the invention, problems relating to both international roaming and also the further processing of the reply to the message are solved.

If, according to what is stated above, a person who is a subscriber wishes to reply only to telephone numbers with the code of his own country, the service provider can send from its own country group messages as a mass sending, in which the number of the sender is converted to an internal number of the recipient's country and the recipients can reply in their own area, without international numbers. In that case, the service provider will require servers in the country in question. Reply messages from the country-specific server are transmitted, for instance, over an IP connection to a server in the service provider's country, in which there is combination logic.

In the above application, it is also possible to the user of the subscription to be offered an opportunity to use a voice message according to the invention.

In the invention, a number external to the network is thus converted into the sender's identifier (=the desired reply address), so that it must return through the radio interface of the network. Thus in the reply situation the message is not routed directly to a service number inside the network, but instead through a radio interface outside the network, so that it roams automatically. For this operation, in one preferred embodiment of the invention there is thus not the short number 16400, but instead the fully roaming international number +358 5016400.

According to the invention, for example, a thousand messages are sent at one time using a bulk-sending application 3, in such a way that each individual message is given converted sender information for the reply message, so that the return messages arrive at different times (as people gradually reply) through several radio modems, so that the momentary capacity required for each radio modem will be small. However, the operation of services outside the service provider's home country, i.e. roaming operation, is achieved with the aid of the invention.

In this application, the term sender information refers to both a telephone number (A number) and to any information whatever, transported with a message, concerning the desired return address.

The method and system according to the invention are implemented, with the aid of at least one computer, in a telecommunications network.

The preferred application environment of the solution according to the invention is disclosed in publication WO 2004/019223, Booking System, messages sent by the system applied to which can be implemented using the mass-sending method according to the present invention.

The invention claimed is:

1. Method for sending messages in a telecommunications network, in which method,
   a first text-form message of the session N is delivered to the user of the service, in such a way that the sender address is converted to correspond to the session number N and the session stage J,
   in stages 2-n of the session N, a text-form message is received, from the user of the message service, at the sender address defined in the message in the previous stage, and the session proceeds according to the contents of the message, in such a way that the sender address is converted to correspond to the session number N and the new session stage J, and the next text-form message of session N is sent to the user of the message service, wherein
   in some stage of the session N, a voice message is received, from the user of the message service, at the sender address of the message defined in the message in the previous stage, or at an address contained in the message, and the session proceeds according to the content of the message, and
   if necessary, the next text-form message of the session N is sent to the user of the message service, in such a way that the sender address is converted to correspond to the session number N and the new session stage J.

2. Method according to claim 1 for sending messages in a telecommunications network, in which method
   digital messages which contain information on the desired reply address are bulk delivered, and
   messages, which are sent on the basis of the reply-address information are received, wherein
   the reply-address information of each bulk-delivered message is converted to correspond to a predefined dialogue, in which the stage of the dialogue defines unequivocally the reply-address information, so that the transmission and reception of the messages are implemented in different parts of the telecommunications system.

3. Method according to claim 1 or 2, wherein the desired reply-address information is the sender field of the message.

4. Method according to claim 1 or 2, wherein the message is an SMS message.

5. Method according to claim 1 or 2, wherein the message is an MMS message.

6. Method according to claim 1 or 2, wherein the message is an e-mail message.

7. Method according to claim 1 or 2, wherein the reply-address information of the message is converted into a national address, such as a national telephone number, functioning in the recipient's own country.

8. System for sending messages in a telecommunications network, which system comprises
   means for delivering (43) the first text-form message of a session N to the user of the service, in such a way that the sender address is converted to correspond to the session number N and the session stage J,
   means for receiving, in stages 2-n of the session N, a text-form message from the user of the message service, at the sender address defined in the message in the previous stage, and the session proceeds according to the contents of the message, in such a way that the sender address is converted to correspond to the session number N and the new session stage J, and the next text-form message of session N is sent to the user of the message service,
   means for receiving (42), in some stage of the session N, a voice message from the user of the message service, at the sender address of the message defined in the message in the previous stage, or at an address contained in the message, and the session proceeds according to the content of the message, and
   means for sending, if necessary, the next text-form message of the session N to the user of the message service, in such a way that the sender address is converted to correspond to the session number N and the new session stage J.

9. System according to claim 8 for sending messages in a telecommunications network, which system comprises
   means for the bulk-delivery of digital messages, which contain information on the desired reply address, and
   means for receiving messages, which are sent on the basis of the reply-address information,
   means for converting the reply-address information of each bulk-delivered message to correspond to a predefined dialogue, in which the stage of the dialogue defines unequivocally the reply-address information, in such a way that the transmission and reception of the messages are implemented in different parts of the telecommunications system.

10. System according to claim 8 or 9, wherein the desired reply-address information is the sender field of the message.

11. System according to claim 8 or 9, wherein the message (40) is an SMS message.

12. System according to claim 8 or 9, wherein the message is an MMS message.

13. System according to claim 8 or 9, wherein the message is an e-mail message.

14. System according to claim 8 or 9, further comprising means for converting the reply-address information of the message into a national address, such as a national telephone number, functioning in the recipient's own country.

15. A method of establishing a service dialogue including a combination of text and voice messages in a communications network, comprising:
    establishing a session for the service dialogue, the session including a number J of logically continuous, temporally separate message stages;
    sending, in a first stage of the session, a text-form message to a user of the service, the sender address of the message representing the session and the number of the session stage;
    receiving, in stages 2 through J of the session, a message at the sender address defined in a message sent in the previous stage or at an address contained in the message sent in the previous stage; and
    sending, in stages 2 through J of the session, a text-form message to the user in response to the contents of the message received in the previous stage,
    wherein in at least one of the stages the received message is a voice message.

16. The method of claim 15, wherein at least one of the text-form messages is a SMS message.

17. The method of claim 15, wherein at least one of the text-form messages is a MMS message.

18. The method of claim 15, wherein at least one of the text-form messages is an e-mails message.

19. A system for establishing a service dialogue including a combination of text and voice messages in a communications network, comprising:
    a plurality of network subscribers; and
    a service operator configured to execute the steps of
        establishing a session for the service dialogue, the session including a number J of logically continuous, temporally separate message stages;
        sending, in a first stage of the session, a text-form message to a user of the service, the sender address of the message representing the session and the number of the session stage;
        receiving, in stages 2 through J of the session, a message at the sender address defined in a message sent in the previous stage or at an address contained in the message sent in the previous stage; and
        sending, in stages 2 through J of the session, a text-form message to the user in response to the contents of the message received in the previous stage,
    wherein in at least one of the stages the received message is a voice message.

20. The system of claim 19, wherein at least one of the text-form messages is a SMS message.

21. The system of claim 19, wherein at least one of the text-form messages is a MMS message.

22. The system of claim 19, wherein at least one of the text-form messages is an e-mails message.

* * * * *